United States Patent
Beck et al.

(10) Patent No.: US 9,382,977 B2
(45) Date of Patent: Jul. 5, 2016

(54) MULTI-RATIO TRANSMISSION

(71) Applicant: ZF Friedrichshafen AG, Friedrichshafen (DE)

(72) Inventors: Stefan Beck, Eriskirch (DE); Timo Wehlen, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 99 days.

(21) Appl. No.: 14/376,655

(22) PCT Filed: Jan. 17, 2013

(86) PCT No.: PCT/EP2013/050782
§ 371 (c)(1),
(2) Date: Aug. 5, 2014

(87) PCT Pub. No.: WO2013/117394
PCT Pub. Date: Aug. 15, 2013

(65) Prior Publication Data
US 2015/0031493 A1   Jan. 29, 2015

(30) Foreign Application Priority Data
Feb. 6, 2012 (DE) .......................... 10 2012 201 681

(51) Int. Cl.
*F16H 3/62* (2006.01)
*F16H 3/66* (2006.01)
*B60K 6/48* (2007.10)

(52) U.S. Cl.
CPC ................. *F16H 3/62* (2013.01); *F16H 3/666* (2013.01); *B60K 2006/4825* (2013.01); *F16H 2200/006* (2013.01); *F16H 2200/2012* (2013.01); *F16H 2200/2043* (2013.01); *Y02T 10/6252* (2013.01)

(58) Field of Classification Search
CPC ............. F16H 3/62; F16H 3/66; F16H 3/666; B60K 2006/4825; Y02T 10/6252
See application file for complete search history.

(56) References Cited

U.S. PATENT DOCUMENTS

| 4,395,925 | A  | 8/1983 | Gaus          |
| 6,572,507 | B1 | 6/2003 | Korkmaz et al.|

(Continued)

FOREIGN PATENT DOCUMENTS

| DE | 29 36 969 A1  | 4/1981 |
| DE | 199 12 480 A1 | 9/2000 |

(Continued)

OTHER PUBLICATIONS

German Search Report Corresponding to 10 2012 201 686.4 mailed Aug. 9, 2013 6 pages.

(Continued)

*Primary Examiner* — Jacob S Scott
(74) *Attorney, Agent, or Firm* — Davis & Bujold PLLC; Michael J. Bujold (57) ABSTRACT

A multi-stage transmission having eight forward and one reverse gear includes planetary gearsets, shafts and shift elements. The sun gear of gearset (P1) couples shaft (3), which can couple, via brake (03), the housing and couples the ring gear of gearset (P3). The input shaft couples the carrier of gearset (P1) and can couple, via clutch (15), shaft (5), which couples the ring and sun gears of respective gearsets (P2, P3). The ring gear of gearset (P1) couples shaft (6) and the sun gear of gearset (P2). Shaft (8) couples the carrier and sun gear of respective gearsets (P3, P4). Shaft (4) couples the carrier of gearset (P4) and can couple, via brake (04), the housing. The input shaft couples the ring gear of gearset (P4) and, via clutch (27), couples shaft (7), which couples the carrier of gearset (P2). Clutch (56, 67, 57) engages to block gearset (P2).

18 Claims, 4 Drawing Sheets

(56) References Cited

U.S. PATENT DOCUMENTS

| | | | |
|---|---|---|---|
| 7,549,942 | B2 | 6/2009 | Gumpoltsberger |
| 7,699,743 | B2 | 4/2010 | Diosi et al. |
| 8,210,981 | B2 | 7/2012 | Bauknecht et al. |
| 2008/0090697 | A1 | 4/2008 | Ortmann et al. |
| 2008/0242492 | A1 | 10/2008 | Phillips et al. |
| 2009/0305837 | A1 | 12/2009 | Hiraiwa |
| 2010/0035718 | A1 | 2/2010 | Saitoh |
| 2010/0069191 | A1 | 3/2010 | Swales et al. |
| 2010/0210399 | A1 | 8/2010 | Wittkopp et al. |
| 2014/0378268 | A1* | 12/2014 | Beck ................. F16H 3/666 475/275 |
| 2015/0005133 | A1* | 1/2015 | Beck ................. B60K 6/48 475/275 |

FOREIGN PATENT DOCUMENTS

| | | |
|---|---|---|
| DE | 10 2004 023 949 A1 | 12/2005 |
| DE | 10 2004 038 516 A1 | 2/2006 |
| DE | 10 2005 010 210 A1 | 9/2006 |
| DE | 10 2006 001 746 A1 | 8/2007 |
| DE | 10 2006 001 760 A1 | 8/2007 |
| DE | 10 2006 006 637 A1 | 9/2007 |
| DE | 10 2008 051 177 A1 | 8/2009 |
| DE | 10 2008 000 428 A1 | 9/2009 |
| DE | 10 2009 009 300 A1 | 9/2009 |
| DE | 2009-270667 A | 11/2009 |
| DE | 10 2009 018 958 A1 | 2/2011 |
| DE | 10 2009 047 265 A1 | 6/2011 |

OTHER PUBLICATIONS

German Search Report Corresponding to 10 2012 201 687.2 mailed Aug. 9, 2013 6 pages.
German Search Report Corresponding to 10 2012 201 690.2 mailed Aug. 12, 2013 6 pages.
German Search Report Corresponding to 10 2012 201 689.9 mailed Aug. 12, 2013 6 pages.
German Search Report Corresponding to 10 2012 201 692.9 mailed Aug. 6, 2013 6 pages.
German Search Report Corresponding to 10 2012 201 685.6 mailed Aug. 7, 2013 6 pages.
German Search Report Corresponding to 10 2012 201 684.8 mailed Aug. 22, 2013 6 pages.
German Search Report Corresponding to 10 2012 201 678.3 mailed Aug. 22, 2013 6 pages.
German Search Report Corresponding to 10 2012 201 682.1 mailed Aug. 22, 2013 6 pages.
German Search Report Corresponding to 10 2012 201 681.3 mailed Aug. 22, 2013 6 pages.
International Search Report Corresponding to PCT/EP2013/050337 mailed Mar. 22, 2013 8 pages.
International Search Report Corresponding to PCT/EP2013/050338 mailed Mar. 22, 2013 8 pages.
International Search Report Corresponding to PCT/EP2013/050340 mailed Mar. 22, 2013 8 pages.
International Search Report Corresponding to PCT/EP2013/050341 mailed Mar. 22, 2013 8 pages.
International Search Report Corresponding to PCT/EP2013/050344 mailed Mar. 22, 2013 8 pages.
International Search Report Corresponding to PCT/EP2013/050345 mailed Mar. 22, 2013 8 pages.
International Search Report Corresponding to PCT/EP2013/050347 mailed Mar. 27, 2013 6 pages.
International Search Report Corresponding to PCT/EP2013/050349 mailed Mar. 27, 2013 6 pages.
International Search Report Corresponding to PCT/EP2013/050350 mailed Mar. 27, 2013 6 pages.
International Search Report Corresponding to PCT/EP2013/050782 mailed Feb. 27, 2013 5 pages.
Written Opinion Corresponding to PCT/EP2013/050337 mailed Mar. 22, 2013 7 pages.

* cited by examiner

| GEAR | ENGAGED SHIFT ELEMENTS ||||| TRANS. RATIO | GEAR STEP |
| --- | --- | --- | --- | --- | --- | --- | --- |
| | BRAKE || CLUTCH ||| | |
| | 03 | 04 | 56 | 15 | 27 | i | φ |
| 1 | ● | ● | | ● | | 5.084 | 1.582 |
| 2 | ● | ● | ● | | | 3.214 | 1.631 |
| 3 | | ● | ● | ● | | 1.970 | 1.245 |
| 4 | | ● | ● | | ● | 1.582 | 1.259 |
| 5 | | ● | | ● | ● | 1.257 | 1.257 |
| 6 | | | ● | ● | ● | 1.000 | 1.221 |
| 7 | ● | | | ● | ● | 0.819 | 1.296 |
| 8 | ● | | ● | | ● | 0.632 | TOTAL 8.040 |
| R | ● | ● | | | ● | -3.575 | |

MULTI-RATIO TRANSMISSION

This application is a National Stage completion of PCT/EP2013/050782 filed Jan. 17, 2013, which claims priority from German patent application serial no. 10 2012 201 681.3 filed Feb. 6, 2012.

FIELD OF THE INVENTION

The present invention relates to a multi-stage transmission in planetary design, in particular an automatic transmission for a motor vehicle.

BACKGROUND OF THE INVENTION

According to the prior art, automatic transmissions, in particular for motor vehicles, comprise planetary gear sets, which are shifted by means of friction or, respectively, shift elements, such as clutches and brakes, and which are typically connected to a start-up element that is subject to a slip effect and that is optionally provided with a bypass clutch, such as a hydrodynamic torque converter or a hydraulic clutch.

Such an automatic transmission is known from DE 199 12 480 B4 by the Applicant, for example. This drive comprises three single-carrier planetary gear sets as well as three brakes and two clutches for the shifting of six forward gears and one reverse gear, an input drive shaft and an output shaft, wherein the carrier of the first planetary gear set is permanently connected to the ring gear of the second planetary gear set, and the carrier of the second planetary gear set is permanently connected to the ring gear of the third planetary gear set, and the input drive shaft is directly connected to the sun gear of the second planetary gear set.

In addition, in the known transmission, it is provided that the input drive shaft can be connected by means of the first clutch to the sun gear of the first planetary gear set, and can be connected by means of the second clutch to the carrier of the first planetary set, wherein the sun gear of the first planetary gear set can be connected by means of the first brake to a housing of the transmission, and the carrier of the first planetary gear set can be connected by means of the second brake to the housing of the transmission, wherein the sun gear of the third planetary gear set can be connected by means of the third brake to the housing of the transmission. The output shaft of the transmission is permanently connected to the carrier of the third planetary gear set and to the ring gear of the first planetary gear set.

In addition, a 9-speed multi-stage transmission is known from DE 29 36 969 A1; it comprises eight shift elements and four planetary gear sets, wherein a planetary gear set serves as a front mounted transmission and the main gearing has a Simpson set and a further planetary gear set which serves as a reverse gear.

Further multi-stage transmissions are known, for example from DE 10 2005 010 210 A1 and DE 10 2006 006 637 A1 by the Applicant.

Automatic vehicle transmissions in planetary design in general have already been described in the prior art and are subject to constant further development and improvement. These transmission should have low construction costs, in particular a low number of shift elements, and with a sequential method of shifting, should avoid double shifting, i.e. a connection or, respectively, disconnection of two shift elements, so that when shifting in defined groups of gears, only one respective shift element is shifted.

A multi-stage transmission in planetary design is known to the Applicant from DE 10 2008 000 428 A1, which has an input drive and an output drive, which is disposed in a housing. In the case of the known transmission, at least four planetary gear sets, referred to in the following as the first, second, third and fourth planetary gear set, at least eight rotatable shafts, referred to in the following as the input drive shaft, output shaft, third, fourth, fifth, sixth, seventh and eighth shaft, as well as at least six shift elements, comprising brakes and clutches, are provided, the selective meshing of which produces different transmission ratios between the input drive and the output drive, so that preferably nine forward gears and one reverse gear can be implemented.

The first and the second planetary gear set, which are preferably designed as a minus planetary gear sets, this having a negative stationary transmission ratio, form a shiftable front mounted gear set thereby, wherein the third and the fourth planetary gear set form a main gear set.

In the case of the known multi-stage transmission, it is provided that the carriers of the first and of the second planetary gear sets are coupled with one another by means of a fourth shaft, which is connected to an element of the main gear set, in that the ring gear of the first planetary gear set is coupled to the sun gear of the second planetary gear set by means of the eighth shaft, which can be detachably connected to the input drive shaft by means of a first clutch, and in that the sun gear of the first planetary gear set can be connected by means of a third shaft through a first brake to a housing of the transmission and can be detachably connected by means of a second clutch to the input drive shaft, wherein the ring gear of the second planetary gear set can be coupled by means of the fifth shaft through a second brake to a housing of the transmission. In addition, the seventh shaft is permanently connected to at least one element of the main gear set and can be connected by means of a third brake to the housing of the transmission, wherein the sixth shaft is permanently connected to at least one additional element of the main gear set and is detachably connected by means of a third clutch to the input drive shaft; the output shaft is permanently connected to at least one additional element of the main gear set.

In the known transmission, the fourth shaft is preferably permanently connected to the ring gear of the third planetary gear set, wherein the sixth shaft is permanently connected to the ring gear of the fourth planetary gear set and to the carrier of the third planetary gear set, and can be detachably connected by means of the third clutch to the input drive shaft. In addition, the seventh shaft is permanently connected to the sun gears of the third and fourth planetary gear set, and can be connected by means of the third brake to a housing of the transmission. The output drive is produced thereby by means of the output shaft, which is permanently connected to the carrier of the fourth planetary gear set. In addition, the third and the fourth planetary gear sets can be assembled or, respectively, reduced into a Ravigneaux gear set having a common carrier and a common ring gear.

SUMMARY OF THE INVENTION

The object of the present invention is to propose a multi-stage transmission of the afore mentioned type, which has eight forward gears and one reverse gear having a sufficient transmission ratio, in which the construction costs and the installation size, in particular the installation length or, respectively, the weight are optimized, and in addition the efficiency is improved in terms of the drag and gearing losses. In addition, in the case of the multi-stage transmission according to the invention, low hogging moments should affect the shift elements. In addition, the transmission should be suitable both for a front longitudinal design and for a front transverse design.

This object is achieved according to the invention by the features described below.

Therefore, a multi-stage transmission according to the invention in planetary design is proposed, which has an input drive and an output drive, which are disposed in a housing. In addition, at least four planetary gear sets, referred to in the following as the first, second, third and fourth planetary gear set, eight rotatable shafts, referred to in the following as the input drive shaft, output shaft, third, fourth, fifth, sixth, seventh and eighth shaft, and at least five shift elements preferably designed as lamellar shift elements or as form fitting shift elements comprising two brakes and three clutches, are provided, the selective meshing of which produces different transmission ratios between the input drive and the output drive, so that preferably eight forward gears and one reverse gear can be implemented.

Viewed axially, the planetary gear sets are preferably disposed in the sequence of the first planetary gear set, the second planetary gear set, the third planetary gear set, and the fourth planetary gear set, wherein the first, second and third planetary gear sets are preferably designed as minus planetary gear sets and wherein the fourth planetary gear set is preferably designed as a plus-planetary gear set. Within the context of further embodiments of the invention, the axial sequence of the planetary gear sets may be in any order.

It is known that a simple minus planetary gear set comprises a sun gear, a ring gear and a carrier, on which planetary gears are rotatably supported each of which mesh with the sun gear and ring gear. When the carrier is fixed, the ring gear has a direction of rotation thereby that is opposite to that of the sun gear. By contrast, a simple plus planetary gear set comprises a sun gear, a ring gear and a carrier, on which internal and external planetary gears are rotatably mounted, wherein all internal planetary gears mesh with the sun gear, and all external planetary gears mesh with the ring gear, wherein the internal planetary gears each mesh with an external planetary gear. When the carrier is fixed the ring gear has the same direction of rotation as the sun gear thereby, and this results in a positive stationary transmission ratio.

According to the invention, the sun gear of the first planetary gear set is connected to the third shaft, which shaft can be coupled by means of a first brake to the housing of the transmission and which is connected to the ring gear of the third planetary gear set, wherein the input drive shaft is connected to the carrier of the first planetary gear set and can be detachably connected by means of a first clutch to the fifth shaft, which shaft is connected to the ring gear of the second planetary gear set and sun gear of the third planetary gear set.

In addition, the ring gear of the first planetary gear set is connected to the sixth shaft of the transmission, which shaft is connected to the sun gear of the second planetary gear set, wherein the eighth shaft is connected to the carrier of the third planetary gear set and to the sun gear of the fourth planetary gear set, and wherein the fourth shaft, which is connected to the carrier of the fourth planetary gear set, can be coupled by means of a second brake to the housing of the transmission.

In addition, the drive shaft of the transmission is connected to the ring gear of the fourth planetary gear set, and can be detachably connected by means of a second clutch to the seventh shaft, which is connected to the carrier of the second planetary gear set. wherein according to the invention, a further clutch is provided, by means of the engagement of which, the second planetary gear set can be blocked.

According to a first embodiment of the invention, the additional clutch is designed as a clutch that detachably connects the fifth shaft to the sixth shaft, such that the second planetary gear set can be blocked by coupling the sun gear of the second planetary gear set with the ring gear of the second planetary gear set.

Within the context of a further embodiment of the invention, the additional clutch can be designed as a clutch that detachably connects the sixth shaft to the seventh shaft, such that the second planetary gear set can be blocked by coupling the carrier of the second planetary gear set with the sun gear of the second planetary gear set.

In addition, the additional clutch can be designed as a clutch that detachably connects the fifth shaft to the seventh shaft, such that the second planetary gear set can be blocked by coupling the carrier of the second planetary gear set with the ring gear of the second planetary gear set.

The design of the multi-stage transmission according to the invention results in transmission ratios that are especially suited for passenger vehicles, as well as an increased overall gear ratio of the multi-stage transmission, which leads to an improvement in the driving comfort and a significant reduction in the fuel consumption.

Moreover, the construction costs are substantially reduced in the case of the multi-stage transmission according to the invention by a low number of shift elements. With the multi-stage transmission according to the invention, it is advantageously possible to perform a start-up using a hydrodynamic converter, an external start-up clutch or also with other suitable, external start-up elements. It is also conceivable that a start-up procedure can be made possible using a start-up element that is integrated in the transmission. Preferably a shift element, which is actuated in the first forward gear and in the reverse gear, is suited for this.

In addition, in the multi-stage transmission according to the invention, a good degree of efficiency is created in the main drive gears in terms of drag and gearing losses.

In addition, there are low torques in the shift elements and in the planetary gear sets of the multi-stage transmission, whereby the abrasive wear in the multi-stage transmission is advantageously reduced. Moreover, the low torques make correspondingly small dimensions possible, whereby the necessary installation space and the associated costs are reduced. In addition, there are also low rotational speeds in the shafts, the shift elements and the planetary gear sets.

Moreover, the transmission according to the invention is designed in such a way that it can be adapted to different drive train embodiments both in the power flow direction, and in terms of spatial aspects.

BRIEF DESCRIPTION OF THE DRAWINGS

The invention is described in greater detail below with reference to the accompanying Figures. Shown are.

DETAILED DESCRIPTION OF THE PREFERRED EMBODIMENTS

Figure 1:
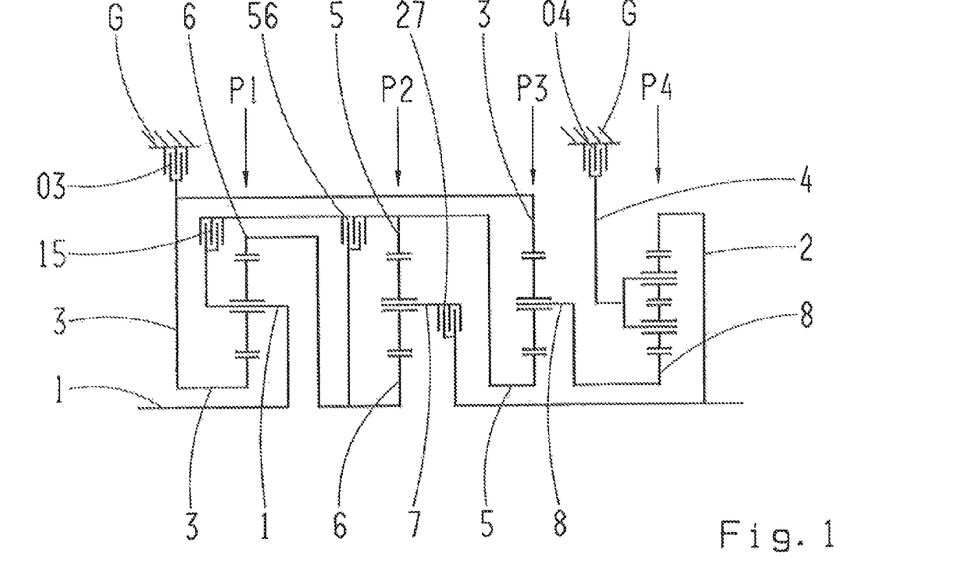
FIG. 1: a schematic view of a first preferred embodiment of a multi-stage transmission according to the invention.

FIG. 1 illustrates a multi-stage transmission according to the invention having an input drive shaft 1, an output shaft 2 and four planetary gear sets P1, P2, P3 and P4, which are disposed in a housing G, In the example shown in FIG. 1, the first, second and third planetary gear sets P1, P2, P3 are designed as minus planetary gear sets, wherein the fourth planetary gear set P4 is designed as a plus planetary gear set. According to the invention, at least one of the planetary gear sets P1, P2, P3 may be designed as a plus planetary gear set when, at the same time, the carrier and ring gear connections are switched and the amount of the stationary transmission ratio is increased by 1 in comparison to the design as a minus planetary gear.

In the case of the embodiment shown, when viewed in an axial direction, the planetary gear sets are disposed in the sequence of the first planetary gear set P1, the second planetary gear set P2, the third planetary gear set P3, the fourth planetary gear set P4.

As can be seen in FIG. 1, five shift elements are provided, namely two brakes 03, 04 and three clutches 15, 27, 56. The spatial configuration of the shift elements can be arbitrary, and is only limited by the dimensions and the external shape. The clutches and the brakes of the transmission are preferably designed as friction or form locking shift elements.

A selective shifting of eight forward gears and one reverse gear can be achieved using these shift elements. The multi-stage transmission according to the invention has a total of eight rotatable shafts, namely the shafts 1, 2, 3, 4, 5, 6, 7 and 8, wherein the input drive shaft forms the first shaft 1 and the output shaft forms the second shaft 2 of the transmission. The output shaft 2 is preferably disposed coaxially to the input drive shaft 1, whereby a front-longitudinal design can be achieved.

According to the invention, in the multi-stage transmission pursuant to FIG. 1, it is provided that the sun gear of the first planetary gear set P1 is connected to the third shaft 3, which shaft can be coupled by means of a first brake 03 to the housing G of the transmission, and which is connected to the ring gear of the third planetary gear set P3, wherein the input drive shaft 1 is connected to the carrier of the first planetary gear set P1 and can be detachably coupled by means of a first clutch 15 to the fifth shaft 5, which shaft is connected to the ring gear of the second planetary gear set P2 and the sun gear of the third planetary gear set P3.

As can be seen in FIG. 1, the ring gear of the first planetary gear set P1 is connected to the sixth shaft 6, which shaft is connected to the sun gear of the second planetary gear set P2, wherein the eighth shaft 8 is connected to the carrier of the third planetary gear set P3 and to the sun gear of the fourth planetary gear set P4. The fourth shaft 4, which is connected to the carrier of the fourth planetary gear set P4, can be coupled by means of a second brake 04 to the housing G of the transmission.

In addition, the drive shaft 2 is connected to the ring gear of the fourth planetary gear set P4, and can be detachably connected by means of a second clutch 27 to the seventh shaft 7, which is connected to the carrier of the second planetary gear set P2, wherein, according to the invention, a further clutch is provided, by means of the engagement of which, the second planetary gear set P2 can be blocked.

In the case of the embodiment shown in FIG. 1, the additional clutch is designed as a third clutch 56 that detachably connects the fifth shaft 5 to the sixth shaft 6; in this way, the second planetary gear set P2 is blocked by coupling the sun gear with the ring gear.

According to the invention, the additional clutch can be designed as a forth clutch 67 that detachably connects the sixth shaft 6 to the seventh shaft 7 so that the second planetary gear set P2 can be blocked by coupling the carrier with the sun gear. This configuration is the subject matter of FIG. 2.

Figure 3:
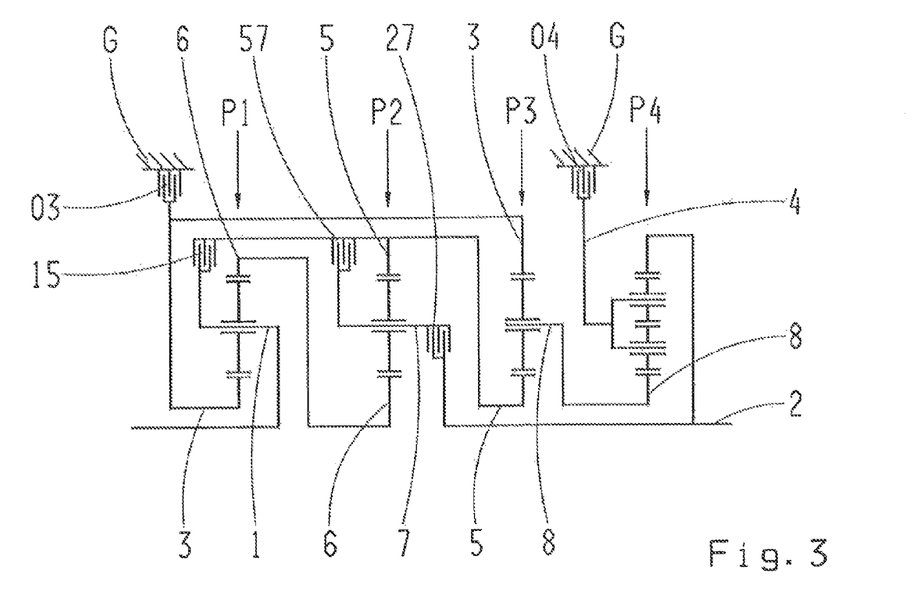
FIG. 3: a schematic view of a third preferred embodiment of a multi-stage transmission according to the invention.

In addition, with reference to the embodiment according to FIG. 3, the additional clutch can be designed as a fifth clutch 57 that detachably connects the fifth shaft 5 to the seventh shaft 7, whereby the second planetary gear set P2 is blocked by coupling the carrier with the ring gear.

Figure 2:
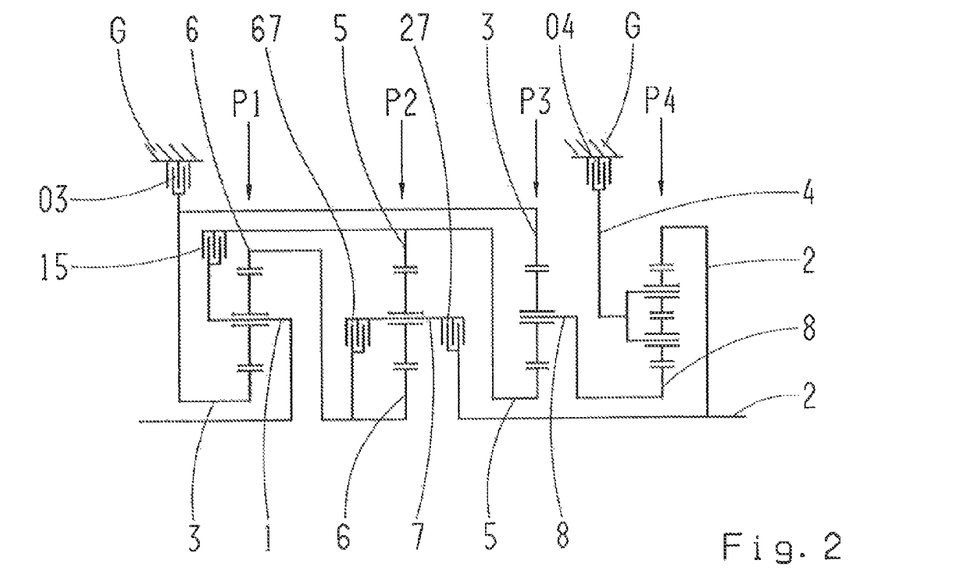
FIG. 2: a schematic view of a second preferred embodiment of a multi-stage transmission according to the invention.
Figure 4:
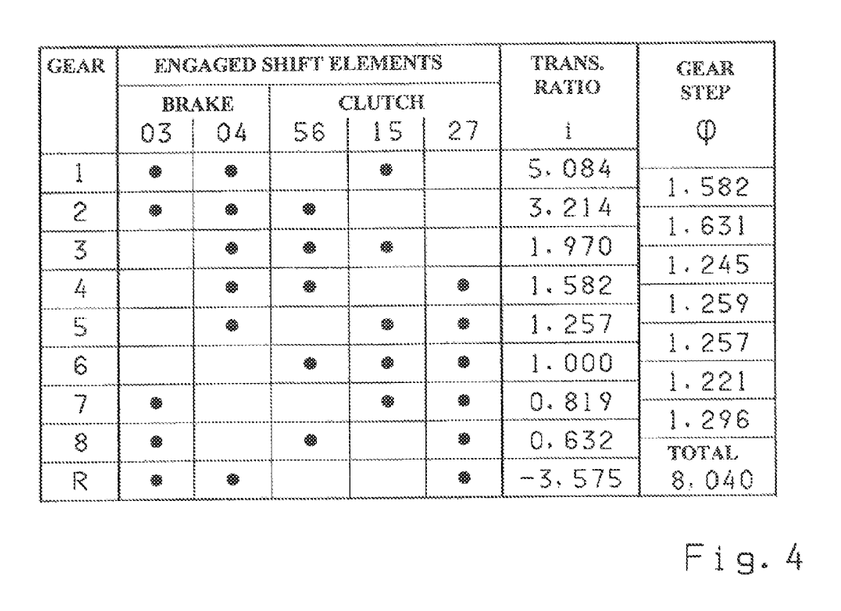
FIG. 4: an example of a shift pattern for a multi-stage transmission pursuant to FIGS. 1 and 3.

FIG. 4 illustrates an example of a shift pattern of a multi-stage transmission pursuant to FIGS. 1, 2 and 3. Three shift elements are engaged for each speed. The shift pattern shows the respective transmission ratios i of the individual gear steps and the gear increments or step changes φ for the next higher speed to be determined therefrom, wherein the value 8.040 represents the transmission ratio spread of the transmission.

In the example shown, the values for the stationary transmission ratios of the planetary gear sets P1, P2, P3, which are designed as minus planetary gear sets, are −1.720, −1.630 and −1.580 respectively, wherein the stationary transmission ratio of the fourth planetary gear set P4, which is designed as a plus-planetary gear set, is 1.970. It is clear from FIG. 4 that in the case of a sequential manner of shifting, only one shift element must be engaged, and one shift element must be disengaged, since two adjacent gear steps use two shared shift elements. In addition, it is apparent that a large transmission ratio spread is obtained having small gear increments.

The first forward gear is created by engaging the first and second brake 03, 04 and the first clutch 15, the second forward gear is created by engaging the first and second brake 03, 04 and the third clutch 56, the third forward gear is created by engaging the second brake 04 and the first and third clutch 15, 56, the fourth forward gear is created by engaging the second brake 04 and the second and third clutch 27, 56, the fifth forward gear is created by engaging the second brake 04 and the first and second clutch 15, 27, the sixth forward gear is created by engaging the first, second and third clutch 15, 27, 56, the seventh forward gear is created by engaging the first brake 03 and the first and second clutch 15, 27 and the eighth forward gear is created by engaging the first brake 03 and the second and third clutch 27, 56, wherein the reverse gear is created by engaging the first and second brake 03, 04 and the second clutch 27.

For the embodiment shown in FIG. 2, the shift pattern differs from the shift pattern according to FIG. 4 only in that the third clutch 56 is replaced by a fourth clutch 67, wherein in the case of a transmission according to FIG. 3, the third clutch 56 is replaced by a fifth clutch 57.

Because the first and second brakes 03, 04 are engaged in the first forward gear and in the reverse gear, these shift elements may be used as start-up elements.

According to the invention, even with the same gear pattern, different gear increments are created depending on the shift logic, so that an application or, respectively, vehicle-specific variation is made possible.

Figure 5:
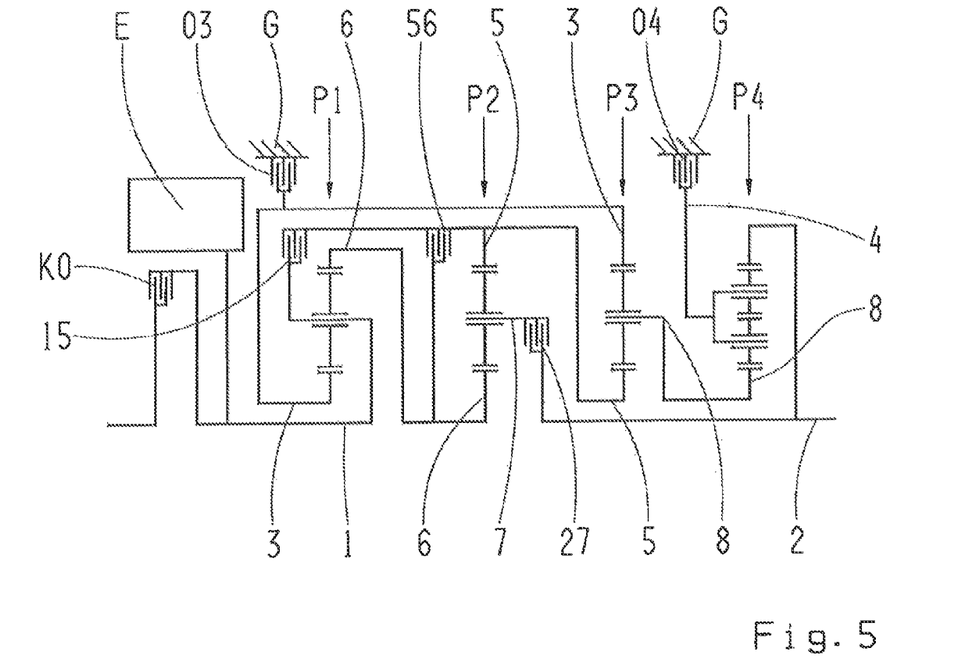
FIG. 5: a schematic view of a hybrid variant of the embodiment according to FIG. 1.
Figure 6:
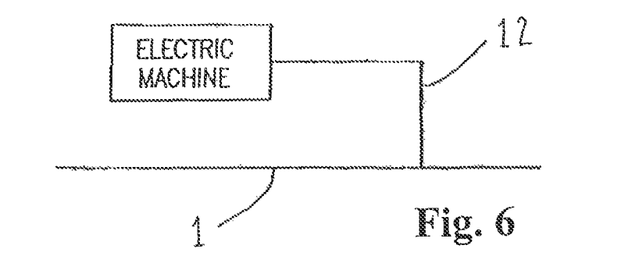
FIG. 6: diagrammatically shows an electrical machine disposed parallel to the input shaft of the multi-stage transmission, according to the invention.

The embodiment shown in FIG. 5 corresponds to the embodiment according to FIG. 1 with the difference that an electric machine E is provided, which is directly connected to the drive shaft 1 of the transmission. As an alternative to direct connection of the electric machine E to the drive shaft 1, the electric machine may be disposed parallel to the axis of the drive shaft 1, and may be connected to the drive shaft 1 by means of a gear step or a chain drive 12 as diagrammatically shown in FIG. 6. In the case of the example shown in FIG. 5, a sixth clutch K0 may be provided, by means of which the internal combustion engine can be disconnected from the transmission, whereby all gears of the transmission can be driven purely electrically.

In a manner analogous to the example given in FIG. 5, the additional embodiments according to the invention according to FIGS. 2 and 3 can also be hybridized.

According to the invention, it is also optionally possible to provide additional freewheels at each suitable position of the multi-stage transmission where applicable, for example between a shaft and the housing, or in order to connect two shafts.

An axle differential and/or a distributor differential can be disposed on the input drive side or on the output drive side.

Within the context of an advantageous refinement of the invention, the input drive shaft 1 can be separated from a drive motor by a clutch element, if needed, wherein a hydrodynamic converter, a hydraulic clutch, a dry start-up clutch, a wet start-up clutch, a magnetic powder clutch or a centrifugal clutch can be used as a clutch element. It is also possible to dispose such a start-up element in the power flow direction behind the transmission, wherein in this case, the input drive shaft 1 is constantly connected to the crank shaft of the drive motor.

In addition, the multi-stage transmission according to the invention makes it possible for a torsional vibration damper to be disposed between the drive motor and the transmission.

Within the context of a further embodiment of the invention not shown here, a wear-free brake, for example such as a hydraulic or electric retarder or the like, can be disposed on each shaft, preferably on the input drive shaft 1 or the output shaft 2, which is of particular importance, especially for use in commercial vehicles. In addition, a power take-off drive may be provided on each shaft, preferably on the input shaft 1 or the output shaft 2 to be driven by additional power engines.

The friction elements used may be designed as power shiftable clutches or brakes. In particular, force locking clutches or brakes, for example such as lamellar clutches, band brakes and/or cone clutches may be used.

A further advantage of the multi-stage transmission put forward here consists in the fact that an electric machine can be attached to each shaft as a generator and/or as an additional drive machine.

REFERENCE FIGURES

1 first shaft, input drive shaft
2 second shaft, output shaft
3 third shaft
4 fourth shaft
5 fifth shaft
6 sixth shaft
7 seventh shaft
8 eighth shaft
03 first brake
04 second brake
15 first clutch
27 second clutch
56 third clutch
57 fifth clutch
67 fourth clutch
E electric machine
G housing
K0 sixth clutch P1 first planetary gear set
P2 second planetary gear set
P3 third planetary gear set
P4 fourth planetary gear set
i transmission ratio
φ step change

The invention claimed is:

1. A multi-stage automatic transmission for a motor vehicle, the transmission comprising:
   an input drive shaft (1) and an output shaft (2);
   first, second, third and fourth planetary gear sets (P1, P2, P3) being arranged in a housing (G), and each of the first, the second, the third and the fourth planetary gear sets comprising a sun gear, a ring gear and a carrier;
   at least third, fourth, fifth, sixth, seventh and eighth rotatable shafts (3, 4, 5, 6, 7, 8);
   at least five shift elements (03, 04, 15, 27, 56, 57, 67) comprising first and second brakes (03, 04) and first, second, and third clutches (15, 27, 56, 57, 67) whose selective engagement results in different transmission ratios between the input drive shaft (1) and the output shaft (2) so that eight forward gears and one reverse gear are implementable;
   the third shaft (3) being connected to both the sun gear of the first planetary gear set (P1) the ring gear of the third planetary gear set (P3), and the third shaft (3) being couplable, by the first brake (03), to the housing (G);
   the input drive shaft (1) being connected to the carrier of the first planetary gear set (P1), the input drive shaft (1) being detachably connected, by the first clutch (15), to the fifth shaft (5), and the fifth shaft (5) being connected to both the ring gear of the second planetary gear set (P2) and the sun gear of the third planetary gear set (P3);
   the sixth shaft (6) being connected to both the ring gear of the first planetary gear set (P1) and the sun gear of the second planetary gear set (P2);
   the eighth shaft (8) being connected to the carrier of the third planetary gear set (P3) and the sun gear of the fourth planetary gear set (P4);
   the fourth shaft (4) being connected to the carrier of the fourth planetary gear set (P4), and the fourth shaft (4) being couplable, by the second brake (04), to the housing (G);
   the output shaft (2) being connected to the ring gear of the fourth planetary gear set (P4), the output shaft (2) being detachably connected by the second clutch (27) to the seventh shaft (7), and the seventh shaft (7) being connected to the carrier of the second planetary gear set (P2); and
   the third clutch (56, 67, 57) being engagable to block the second planetary gear set (P2).

2. The multi-stage transmission according to claim 1, wherein the third clutch (56) detachably connects the fifth shaft (5) to the sixth shaft (6) so that, when the third clutch (56) is engaged, the second planetary gear set (P2) is blocked by coupling the sun gear of the second planetary gear set (P2) with the ring gear of the second planetary gear set (P2).

3. The multi-stage transmission according to claim 1, wherein the third clutch (67) detachably connects the sixth shaft (6) to the seventh shaft (7) so that, when the third clutch (67) is engaged, the second planetary gear set (P2) is blocked by coupling the carrier of the second planetary gear set (P2) with the sun gear of the second planetary gear set (P2).

4. The multi-stage transmission according to claim 1, wherein the third clutch (57) detachably connects the fifth shaft (5) to the seventh shaft (7) so that, when the third clutch (57) is engaged, the second planetary gear set (P2) is blocked by coupling the carrier of the second planetary gear set (P2) with the ring gear of the second planetary gear set (P2).

5. The multi-stage transmission according to claim 1, wherein the first, the second and the third planetary gear sets (P1, P2, P3) are designed as minus planetary gear sets, and the fourth planetary gear set (P4) is designed as a plus planetary gear set.

6. The multi-stage transmission according to claim 1, wherein, when viewed in an axial direction, the first, the second, the third and the fourth planetary gear sets (P1, P2, P3, P4) are disposed in a sequence of the first planetary gear set (P1), the second planetary gear set (P2), the third planetary gear set (P3), and the fourth planetary gear set (P4).

7. The multi-stage transmission according to claim 1, wherein an electric machine (E) is connected to the input drive shaft (1) of the transmission.

8. The multi-stage transmission according to claim 1, wherein an electric machine (E) is connected to the input drive shaft (1) of the transmission by either a gear stage or a chain drive.

9. The multi-stage transmission according to claim 7, wherein a combustion motor is disconnectable from the transmission by a fourth clutch (K0), whereby all transmission gears can be driven purely electrically.

10. The multi-stage transmission according to claim 8, wherein a combustion motor is disconnectable from the transmission by a fourth clutch (K0), whereby all transmission gears can be driven purely electrically.

11. The multi-stage transmission according to claim 1, wherein the third clutch (56) detachably connects the fifth shaft (5) to the sixth shaft (6), and a first forward gear is implemented by engagement of the first and the second brakes (03, 04) and the first clutch (15),
    a second forward gear is implemented by engagement of the first and the second brakes (03, 04) and the third clutch (56),
    a third forward gear is implemented by engagement of the second brake (04) and the first and the third clutches (15, 56),
    a fourth forward gear is implemented by engagement of the second brake (04) and the second and the third clutches (27, 56),
    a fifth forward gear is implemented by engagement of the second brake (04) and the first and the second clutches (15, 27),
    a sixth forward gear is implemented by engagement of the first, the second and the third clutches (15, 27, 56),
    a seventh forward gear is implemented by engagement of the first brake (03) and the first and the second clutches (15, 27),
    an eighth forward gear is implemented by engagement of the first brake (03) and the second and the third clutches (27, 56), and
    the reverse gear is implemented by engagement of the first and the second brakes (03, 04) and the second clutch (27).

12. The multi-stage transmission according to claim 1, wherein the third clutch (67) detachably connects the sixth shaft (6) to the seventh shaft (7), and a first forward gear is implemented by engagement of the first and the second brakes (03, 04) and the first clutch (15),
    a second forward gear is implemented by engagement of the first and the second brakes (03, 04) and the third clutch (67),
    a third forward gear is implemented by engagement of the second brake (04) and the first and the third clutches (15, 67),
    a fourth forward gear is implemented by engagement of the second brake (04) and the second and the third clutches (27, 67),
    a fifth forward gear is implemented by engagement of the second brake (04) and the first and the second clutches (15, 27),
    a sixth forward gear is implemented by engagement of the first, the second and the third clutches (15, 27, 67),
    a seventh forward gear is implemented by engagement of the first brake (03) and the first and the second clutches (15, 27),
    an eighth forward gear is implemented by engagement of the first brake (03) and the second and the third clutches (27, 67), and
    the reverse gear is implemented by engagement of the first and the second brakes (03, 04) and the second clutch (27).

13. The multi-stage transmission according to claim 1, wherein the third clutch (57) detachably connects the fifth shaft (5) to the seventh shaft (7), and a first forward gear is implemented by engagement of the first and the second brakes (03, 04) and the first clutch (15),
    a second forward gear is implemented by engagement of the first and the second brakes (03, 04) and the third clutch (57),
    a third forward gear is implemented by engagement of the second brake (04) and the first and the third clutches (15, 57),
    a fourth forward gear is implemented by engagement of the second brake (04) and the second and the third clutches (27, 57),
    a fifth forward gear is implemented by engagement of the second brake (04) and the first and the second clutches (15, 27),
    a sixth forward gear is implemented by engagement of the first, the second and the third clutches (15, 27, 57),
    a seventh forward gear is implemented by engagement of the first brake (03) and the first and the second clutches (15, 27),
    an eighth forward gear is implemented by engagement of the first brake (03) and the second and the third clutches (27, 57), and
    the reverse gear is implemented by engagement of the first and the second brakes (03, 04) and the second clutch (27).

14. The multi-stage transmission according to claim 1, wherein the third clutch (56, 67, 57) is engagable for rigidly coupling two of:
    a) the sun gear,
    b) the ring gear, and
    c) the carrier
of the second planetary gear set (P2) with one another.

15. A multi-stage automatic transmission for a motor vehicle, the transmission comprising:
    an input drive shaft (1) and an output shaft (2);
    first, second, third and fourth planetary gear sets (P1, P2, P3) being arranged in a housing (G), and each of the first, the second, the third and the fourth planetary gear sets comprising a sun gear, a ring gear and a carrier;
    at least third, fourth, fifth, sixth, seventh and eighth rotatable shafts (3, 4, 5, 6, 7, 8);
    at least five shift elements (03, 04, 15, 27, 56, 57, 67) comprising first and second brakes (03, 04) and first, second and third clutches (15, 27, 56, 57, 67), selective engagement of the at least five shift elements results in different transmission ratios between the input drive shaft (1) and the output shaft (2) such that eight forward gears and one reverse gear are implementable;

the input drive shaft (1) being continuously connected to the carrier of the first planetary gear set (P1) and the input drive shaft (1) being connectable, via the first clutch (15), to the fifth shaft (5);

the output shaft (2) being continuously connected to the ring gear of the fourth planetary gear set (P4), and the output shaft (2) being connectable, via the second clutch (27), to the seventh shaft (7);

the third shaft (3) being continuously connected to both the sun gear of the first planetary gear set (P1) and the ring gear of the third planetary gear set (P3), and the third shaft (3) being connectable, via the first brake (03), to the housing (G);

the fourth shaft (4) being continuously connected to the carrier of the fourth planetary gear set (P4), and the fourth shaft (4) being connectable, via the second brake (04), to the housing (G);

the fifth shaft (5) being continuously connected to the ring gear of the second planetary gear set (P2) and the sun gear of the third planetary gear set (P3);

the sixth shaft (6) being continuously connected to the ring gear of the first planetary gear set (P1) and the sun gear of the second planetary gear set (P2);

the seventh shaft (7) being continuously connected to the carrier of the second planetary gear set (P2);

the eighth shaft (8) being continuously connected to the carrier of the third planetary gear set (P3) and the sun gear of the fourth planetary gear set (P4); and the third clutch (56, 67, 57) being engagable for blocking the second planetary gear (P2).

16. The multi-stage transmission according to claim 15, wherein the third clutch (56) detachably connects the fifth shaft (5) to the sixth shaft (6), and a first forward gear is implemented by engagement of the first and the second brakes (03, 04) and the first clutch (15), a second forward gear is implemented by engagement of the first and the second brakes (03, 04) and the third clutch (56), a third forward gear is implemented by engagement of the second brake (04) and the first and the third clutches (15, 56), a fourth forward gear is implemented by engagement of the second brake (04) and the second and the third clutches (27, 56), a fifth forward gear is implemented by engagement of the second brake (04) and the first and the second clutches (15, 27), a sixth forward gear is implemented by engagement of the first, the second and the third clutches (15, 27, 56), a seventh forward gear is implemented by engagement of the first brake (03) and the first and the second clutches (15, 27), an eighth forward gear is implemented by engagement of the first brake (03) and the second and the third clutches (27, 56), and the reverse gear is implemented by engagement of the first and the second brakes (03, 04) and the second clutch (27).

17. The multi-stage transmission according to claim 15, wherein the third clutch (67) detachably connects the sixth shaft (6) to the seventh shaft (7), and a first forward gear is implemented by engagement of the first and the second brakes (03, 04) and the first clutch (15), a second forward gear is implemented by engagement of the first and the second brakes (03, 04) and the third clutch (67), a third forward gear is implemented by engagement of the second brake (04) and the first and the third clutches (15, 67), a fourth forward gear is implemented by engagement of the second brake (04) and the second and the third clutches (27, 67), a fifth forward gear is implemented by engagement of the second brake (04) and the first and the second clutches (15, 27), a sixth forward gear is implemented by engagement of the first, the second and the third clutches (15, 27, 67), a seventh forward gear is implemented by engagement of the first brake (03) and the first and the second clutches (15, 27), an eighth forward gear is implemented by engagement of the first brake (03) and the second and the third clutches (27, 67), and the reverse gear is implemented by engagement of the first and the second brakes (03, 04) and the second clutch (27).

18. The multi-stage transmission according to claim 15, wherein the third clutch (57) detachably connects the fifth shaft (5) to the seventh shaft (7), and a first forward gear is implemented by engagement of the first and the second brakes (03, 04) and the first clutch (15), a second forward gear is implemented by engagement of the first and the second brakes (03, 04) and the third clutch (57), a third forward gear is implemented by engagement of the second brake (04) and the first and the third clutches (15, 57), a fourth forward gear is implemented by engagement of the second brake (04) and the second and the third clutches (27, 57), a fifth forward gear is implemented by engagement of the second brake (04) and the first and the second clutches (15, 27), a sixth forward gear is implemented by engagement of the first, the second and the third clutches (15, 27, 57), a seventh forward gear is implemented by engagement of the first brake (03) and the first and the second clutches (15, 27), an eighth forward gear is implemented by engagement of the first brake (03) and the second and the third clutches (27, 57), and the reverse gear is implemented by engagement of the first and the second brakes (03, 04) and the second clutch (27).

\* \* \* \* \*